(12) United States Patent
Jang et al.

(10) Patent No.: US 10,246,780 B2
(45) Date of Patent: Apr. 2, 2019

(54) NON-COMBUSTIBLE COLOR STEEL SHEET FOR HOUSEHOLD APPLIANCES AND BUILDING MATERIALS AND METHOD FOR MANUFACTURING SAME

(71) Applicant: HYUNDAI STEEL COMPANY, Incheon (KR)

(72) Inventors: Jong-Mun Jang, Daejeon (KR); Min-Yeong Jeong, Jeollanam-do (KR); Hye-Ri Kim, Gyeongsangnam-do (KR); Yong-Soo Jeong, Jeollanam-do (KR); Yong Hee Kim, Jeollanam-do (KR)

(73) Assignee: Hyundai Steel Company, Incheon (KR)

( * ) Notice: Subject to any disclaimer, the term of this patent is extended or adjusted under 35 U.S.C. 154(b) by 71 days.

(21) Appl. No.: 15/165,835

(22) PCT Filed: Aug. 26, 2014

(86) PCT No.: PCT/KR2014/007950
§ 371 (c)(1),
(2) Date: May 26, 2016

(87) PCT Pub. No.: WO2015/080365
PCT Pub. Date: Jun. 4, 2015

(65) Prior Publication Data
US 2016/0312367 A1   Oct. 27, 2016

(30) Foreign Application Priority Data

Nov. 27, 2013   (KR) ........................ 10-2013-0145442

(51) Int. Cl.
| | |
|---|---|
| B05D 7/00 | (2006.01) |
| C09D 5/18 | (2006.01) |
| C23C 2/06 | (2006.01) |
| C23C 2/26 | (2006.01) |
| C25D 3/22 | (2006.01) |
| C25D 7/06 | (2006.01) |
| C23C 28/00 | (2006.01) |

(52) U.S. Cl.
CPC ............... *C23C 28/00* (2013.01); *B05D 7/52* (2013.01); *C09D 5/18* (2013.01); *C23C 2/06* (2013.01); *C23C 2/26* (2013.01); *C25D 3/22* (2013.01); *C25D 7/0614* (2013.01)

(58) Field of Classification Search
CPC .. C23C 28/00; C23C 2/26; C23C 2/06; C09D 5/18; B05D 7/52; C25D 3/22; C25D 7/0614; C23D 2/26
See application file for complete search history.

(56) References Cited

U.S. PATENT DOCUMENTS

2004/0110870 A1   6/2004   Liu

FOREIGN PATENT DOCUMENTS

| CN | 1309726 A | 8/2001 |
|---|---|---|
| CN | 102431264 A | 5/2012 |
| CN | 103030968 A | 4/2013 |
| EP | 1961790 A1 | 8/2008 |
| JP | 10316900 A | 12/1998 |
| JP | 2004075936 A | 3/2004 |
| KR | 10-20040025310 A | 3/2004 |
| KR | 10-2005-0073790 A | 7/2005 |
| KR | 100956752 B1 | 5/2010 |
| KR | 10-1049966 B1 | 7/2011 |

OTHER PUBLICATIONS

Korean Intellectual Property Office, International Search Report dated Nov. 14, 2014, issued in corresponding International Application No. PCT/KR2014/007950; 4 pages.
Notification of First Office Action dated Jun. 20, 2017 by the State Intellectual Property Office of P.R. China, in corresponding Chinese Patent Application No. 201480064613.X.
Extended Europan Search Report, of the European Patent Office, dated Jun. 17, 2017, in corresponding European Patent Application No. 14866127.5.

*Primary Examiner* — Rabon A Sergent
(74) *Attorney, Agent, or Firm* — Locke Lord LLP; Daniel J. Fiorello

(57) ABSTRACT

An incombustible color-coated steel sheet for household appliances and building materials and a method for manufacturing the same, includes a flame-retardant coating composition that is a colored coating composition coated on a base steel sheet so that the coated steel sheet can have more than a certain level of flame-retardant properties and can also exhibit excellent physical properties, including processability, coating adhesion, corrosion resistance, and hardness.

10 Claims, 2 Drawing Sheets

NON-COMBUSTIBLE COLOR STEEL SHEET FOR HOUSEHOLD APPLIANCES AND BUILDING MATERIALS AND METHOD FOR MANUFACTURING SAME

CROSS REFERENCE TO RELATED APPLICATIONS

This application is the national phase under 35 U.S.C. § 371 of PCT International Application No. PCT/KR2014/007950, filed Aug. 26, 2014, which claims the benefit of and priority to Korean Patent Application No. 10-2013-0145442 filed Nov. 27, 2013. The entire contents of this patent application are hereby incorporated by reference herein.

TECHNICAL FIELD

The present invention relates to an incombustible color-coated steel sheet and a method for manufacturing the same, and more particularly, to an incombustible color-coated steel sheet for household appliances and building materials and a method for manufacturing the same, in which a flame-retardant coating composition that is a colored coating composition is coated on a base steel sheet so that the coated steel sheet can have more than a certain level of flame-retardant properties and can also exhibit excellent physical properties, including processability, coating adhesion, corrosion resistance, hardness, etc.

BACKGROUND ART

The demand for color-coated steel sheets for use in building materials, household appliances, cars, etc, is increasing. In particular, in domestic and foreign cold-rolled product manufacturers which produce hot-dip galvanized steel sheets and electro-galvanized steel sheets and in surface treatment companies which treat other steel materials, products are produced by performing, as final post-treatment, chemical treatment processes such as chromate treatment and phosphate treatment.

Herein, the chromate treatment refers to covering a steel sheet with an anti-rust coating layer by immersing the steel sheet in a solution containing chromate or dichromate as a main component. This chromate treatment is an inexpensive treatment process that imparts excellent corrosion resistance and coating adhesion to the steel sheet.

However, because chromium is one of representative toxic pollutants and causes serious damage to workers and the environment, regulations for restricting the use of such toxic pollutants have been enacted in advanced countries, and such regulations have been enforced worldwide.

In addition, in the case of chromate-treated steel sheets, hexavalent chromium ($Cr^{+6}$) is generated in wastewater during the process, and thus treatment of this wastewater is highly expensive and time-consuming. Moreover, because it is expected that the use of chromate treatment will be prohibited in the near future through international regulations on the use of chromium, studies on chromate treatment are now no longer conducted, and studies on the development of materials capable of replacing chromium have been actively conducted worldwide.

Regarding studies conducted to date, studies have been conducted to develop a solution of 100% trivalent chromium by reducing the amount of hexavalent chromium because hexavalent chromium is more toxic than trivalent chromium. However, these studies do not aim at removal of chromium, and the 100% trivalent chromium solution does not have any merit to replace an existing chromate solution in view of corrosion resistance and price.

Thus, in recent years, efforts have been made to use water-soluble type ceramic coatings to provide both excellent hardness and processability. However, ceramic coatings have disadvantages in that they cannot be processed or require a high treatment temperature and a very long treatment time, which lead to low yield and productivity. In addition, when ceramic coatings are used, there is a problem in that the ceramic coatings can be applied only to sheets.

Prior art documents related to the present invention include Korean Laid-Open Patent Publication No. 10-2005-0073790 (published on Jul. 18, 2005) which discloses a coating for a color-coated steel sheet, which shows various patterns, and a method for manufacturing a color-coated steel sheet using the same.

DISCLOSURE

Technical Problem

It is an object of the present invention to provide a method for manufacturing an incombustible color-coated steel sheet for household appliances and building materials, in which the incombustible color-coated steel sheet is excellent in physical properties, including solvent resistance, fingerprint resistance, corrosion resistance, processability, lubricity, hardness and the like, which are the fundamental properties of coatings, and, at the same time, has both high hardness and high processability as a result of introducing urethane using a silica sol.

Another object of the present invention is to provide an incombustible color-coated steel sheet for household appliances and building materials, which is manufactured by coating a base steel sheet with a water-soluble silica sol having a very small amount of volatile organic compounds (VOCs), and thus which has high flame retardancy and can ensure scratch resistance, easy cleaning, water resistance, water repellency and salt water resistance, which are the characteristics of ceramics.

Technical Solution

In accordance with an embodiment of the present invention, a method for manufacturing an incombustible color-coated steel sheet includes the steps of: (a) applying an under-coating agent to a base steel sheet, followed by heat drying, thereby forming a pretreatment layer; (b) applying a primer coating composition to the pretreatment layer, followed by heat drying, thereby forming a primer layer; and (c) applying to the primer layer a flame-retardant coating composition including, based on 100 parts by weight, 15-20 parts by weight of silica sol, 5-15 parts by weight of polyurethane resin, 40-70 parts by weight of a solvent, 5-15 parts by weight of deionized water (DIW), 1-3 parts by weight of an acid catalyst, 0.1-2.0 parts by weight of an acid stabilizer, and 5-20 parts by weight of a pigment, followed by drying and curing, thereby forming a flame-retardant coating layer.

In accordance with an embodiment of the present invention, an incombustible color-coated steel sheet includes: a base steel sheet; a pretreatment layer coated on the base steel sheet; a primer layer coated on the pretreatment layer; and a flame-retardant coating layer coated on the primer layer and including, based on 100 parts by weight, 15-20 parts by weight of silica sol, 5-15 parts by weight of polyurethane resin, 40-70 parts by weight of a solvent, 1-3 parts by weight of an acid catalyst, 0.1-2.0 parts by weight of an acid stabilizer, and 5-20 parts by weight of a pigment.

Advantageous Effects

The incombustible color-coated steel sheet for household appliances and building materials according to the present invention is excellent in physical properties, including solvent resistance, fingerprint resistance, corrosion resistance, processability, lubricity, hardness and the like, which are the fundamental properties of coatings, and, at the same time, has both high hardness and high processability as a result of introducing urethane using a silica sol.

Furthermore, the incombustible color-coated steel sheet is manufactured by coating a base steel sheet with a water-soluble silica sol having a very small amount of volatile organic compounds (VOCs), and thus has high flame retardancy and can ensure scratch resistance (anti-graffiti), easy cleaning, water resistance, water repellency and salt water resistance, which are the characteristics of ceramics.

In addition, the incombustible color-coated steel sheet for household appliances and building materials according to the present invention has advantages in that the flame-retardant coating layer has the characteristic appearance of coatings even though it has a thickness that is at least two times smaller than the thickness of a general top-coat layer (15-25 μm), and in that the flame-retardant coating layer has excellent flame-retardancy, corrosion resistance, scratch resistance, solvent resistance and lubricity, contains no chromium, and is water-soluble and environmentally friendly.

BEST MODE

Figure 1:
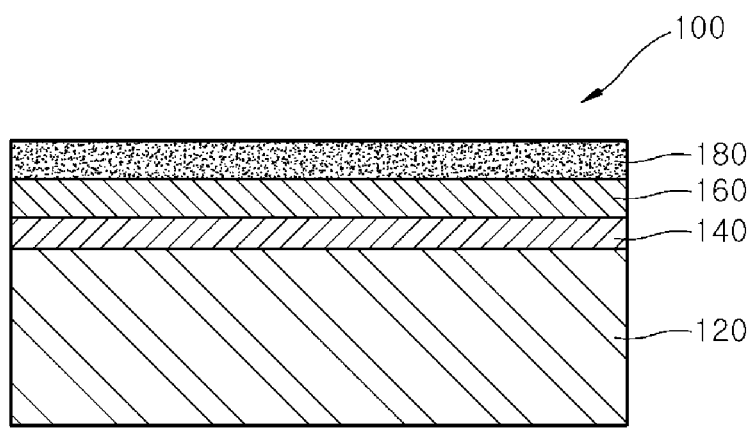
FIG. 1 is a cross-sectional view schematically showing an incombustible color-coated steel sheet according to an embodiment of the present invention.

The advantages and features of the present invention, and the way of attaining them, will become apparent with reference to the exemplary embodiments described below in conjunction with the accompanying drawings. However, the present invention is not limited to the exemplary embodiments disclosed below and can be embodied in a variety of different forms; rather, these embodiments are provided so that this disclosure will be thorough and complete, and will fully convey the scope of the present invention to those skilled in the art. The scope of the present invention will be defined by the appended claims. Like reference numerals refer to like elements throughout the specification and the accompanying figures.

Hereinafter, an incombustible color-coated steel sheet for household appliances and building materials according to exemplary embodiments of the present invention, and a method for manufacturing the same, will be described in detail with reference to the accompanying drawings.

Incombustible Color-Coated Steel Sheet

FIG. 1 is a cross-sectional view schematically showing an incombustible color-coated steel sheet according to an embodiment of the present invention.

Referring to FIG. 1, an incombustible color-coated steel sheet 100 according to an embodiment of the present invention includes a base steel sheet 120, a pretreatment layer 140, a primer layer 160, and a flame-retardant coating layer 180.

The base steel sheet 120 may be any one selected from among a hot-dip galvanized steel sheet, an electro-galvanized steel sheet and the like.

The pretreatment layer 140 is coated on the base steel sheet 120. Although not shown in the drawings, the pretreatment layer 140 may be coated on both sides of the base steel sheet 120. This pretreatment layer 140 is formed for the purpose of providing a surface treatment layer before performing coating on the base steel sheet 120, and may be formed by applying an undercoating agent, followed by heat drying.

The primer layer 160 is coated on the pretreatment layer 140. Although not shown in the drawings, this primer layer 160 may be coated on both sides of the pretreatment layer 140. This primer layer 160 may be formed by applying a primer coating composition to the pretreatment layer 140, followed by heat drying.

The primer layer 160 is formed for the purpose of increasing the flexibility and processability of the flame-retardant coating layer 180. In particular, the primer layer 160 serves to enhance properties such as corrosion resistance, processability, adhesion and the like. The primer layer 160 preferably has a thickness of 0.3-1.0 μm. If the thickness of the primer layer 160 is less than 0.3 μm, processability will be enhanced, but a problem will arise in that corrosion resistance and adhesion are reduced. On the contrary, if the thickness of the primer layer 160 is more than 1.0 μm, the thickness of the coating layer will be increased while the effect of the primer layer 160 will no longer increase, and the resulting increase in the thickness of the coating layer can reduce processability and cause cracks.

Herein, the primer layer 160 may include 50-60 wt % of polyester resin, 25-30 wt % of colloidal silica, 0.5-2.0 wt % of an epoxy-activating phosphoric acid compound, 0.5-1.0 wt % of a silane coupling agent, 0.1-10 wt % of an anti-corrosive agent selected from among titanium sol, silica sol and zirconium sol, and 0.01-0.20 wt % of a wetting agent. The composition of the primer layer 160 and the ratio of components thereof will be described in detail later.

The flame-retardant coating layer 180 is coated on the primer layer 160. This flame-retardant coating layer 180 may be formed by applying a flame-retardant coating composition to the primer layer 160, followed by drying and curing. This flame-retardant coating layer 180 preferably has a thickness of 5-10 μm. If the thickness of the flame-retardant coating layer 180 is less than 5 μm, it will be difficult to ensure properties such as corrosion resistance, scratch resistance and the like. On the contrary, if the thickness of the flame-retardant coating layer 180 is more than 10 μm, a problem will arise in that adhesion and processability are reduced.

Herein, the flame-retardant coating layer 180 may include, based on 100 parts by weight, 15-20 parts by weight of silica sol, 5-15 parts by weight of polyurethane resin, 40-70 parts by weight of a solvent, 1-3 parts by weight of an acid catalyst, 0.1-2.0 parts by weight of an acid stabilizer, and a 5-20 parts by weight of a pigment. The composition of the flame-retardant coating layer 180 and the ratio of components thereof will be described in detail later.

Particularly, the silica sol is the main component of the flame-retardant coating layer 180, and is added for the purpose of ensuring solvent resistance, fingerprint resistance, corrosion resistance, processability, lubricity, hardness and the like, which are the fundamental properties of coatings. Particularly, according to the present invention, both high hardness and high processability can be ensured as a result of introducing urethane using the silica sol. In addition, the flame-retardant coating layer 180 is formed by coating the base steel sheet 120 with the water-soluble silica sol containing a very low amount of volatile organic compounds (VOCs), whereby it has high flame retardancy and can ensure scratch resistance (anti-graffiti), easy cleaning, water resistance, water repellency and salt water resistance, which are the characteristics of ceramics.

As described above, the incombustible color-coated steel sheet for household appliances and building materials according to the embodiment of the present invention is excellent in physical properties, including solvent resistance, fingerprint resistance, corrosion resistance, processability, lubricity, hardness and the like, which are the fundamental properties of coatings, and, at the same time, has both high hardness and high processability as a result of introducing urethane using the silica sol. Furthermore, the incombustible color-coated steel sheet is manufactured by coating the base steel sheet with the water-soluble silica sol containing a very small amount of volatile organic compounds (VOCs), and thus has high flame retardancy and can ensure scratch resistance (anti-graffiti), easy cleaning, water resistance, water repellency and salt water resistance, which are the characteristics of ceramics.

In addition, the incombustible color-coated steel sheet for household appliances and building materials according to the present invention has advantages in that the flame-retardant coating layer has the characteristic appearance of coatings even though it has a thickness that is at least two times smaller than the thickness of a general top-coat layer (15-25 μm), and in that the flame-retardant coating layer has excellent flame-retardancy, corrosion resistance, scratch resistance, solvent resistance and lubricity, contains no chromium, and is water-soluble and environmentally friendly.

Method for Manufacturing Incombustible Color-Coated Steel Sheet

Hereinafter, a method for manufacturing an incombustible color-coated steel sheet for household appliances and building materials according to an embodiment of the present invention will be described in detail.

Figure 2:
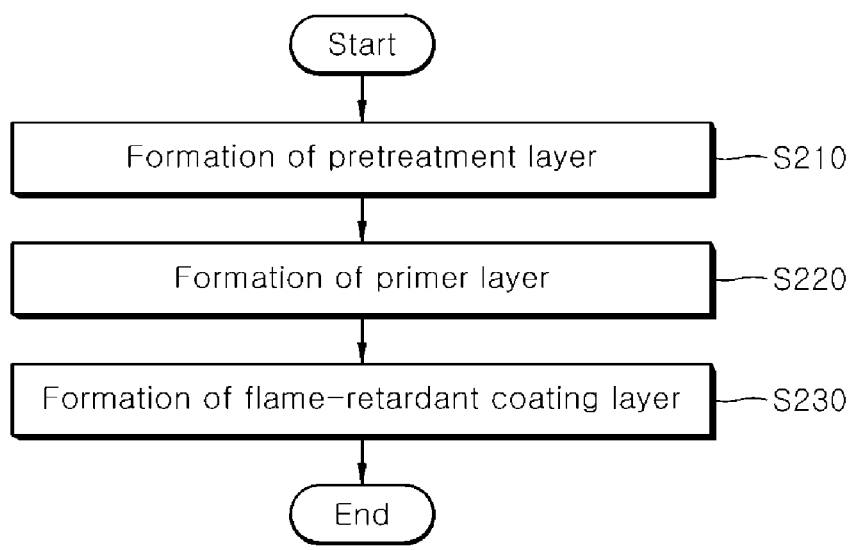
FIG. 2 is a process flow chart schematically showing a method for manufacturing an incombustible color-coated steel sheet according to an embodiment of the present invention.

FIG. 2 is a process flow chart schematically showing a method for manufacturing an incombustible color-coated steel sheet according to an embodiment of the present invention.

Referring to FIG. 2, a method for manufacturing an incombustible color-coated steel sheet according to an embodiment of the present invention includes the steps of: (S210) forming a pretreatment layer 140; (S220) forming a primer layer 160; and (S230) forming a flame-retardant coating layer.

Formation of Pretreatment Layer

In step (S210) of forming a pretreatment layer 140, an under-coating agent is applied on a base steel sheet 120, followed by heat drying, thereby forming a pretreatment layer 140. Herein, the base steel sheet used may be any one selected from among a hot-dip galvanized steel sheet, an electro-galvanized steel sheet and the like. This pretreatment layer 140 is formed for the purpose of providing a surface treatment layer before performing coating, and may be formed by applying an undercoating agent, followed by heat drying.

Formation of Primer Layer

In step (S220) of forming a primer layer 160, a primer coating composition is coated on the pretreatment layer 140, followed by heat drying, thereby forming a primer layer 160.

This primer layer 160 may be formed by applying a primer coating composition to the pretreatment layer 140, followed by heat drying.

Herein, the coating process may be performed by at least one method selected from among spray squeezing, roll coating, and dipping.

This primer layer 160 is preferably dried at a first heat-drying temperature (peak metal temperature (PMT)) of 120 to 200° C. If the first heat-drying temperature is lower than 120° C., drying will not be completely achieved, and thus workability can be reduced. On the contrary, if the first heat-drying temperature is higher than 200° C., the adhesion of the primer layer 160 to the pretreatment layer 140 and the base steel layer 120 can be reduced due to abnormal drying, resulting in a reduction in overall surface properties.

Meanwhile, the primer layer 160 may include 50-60 wt % of polyester resin, 25-30 wt % of colloidal silica, 0.5-2.0 wt % of an epoxy-activating phosphoric acid compound, 0.5-1.0 wt % of a silane coupling agent, 0.1-10 wt % of an anti-corrosive agent selected from among titanium sol, silica sol and zirconium sol, and 0.01-0.20 of a wetting agent.

The composition for forming the primer layer 160 may include water in addition to the above components, and may also include a very small amount of impurities that are inevitably incorporated during the preparation process.

The polyester resin is a main component for forming the primer layer 160. If the amount of polyester resin added is less than 50 wt %, the composition for application can be made dilute, and the drying and use thereof cannot be easy. On the contrary, the amount of polyester resin added is more than 60 wt %, a problem will arise in that the curing property of the composition is reduced or the composition is not uniformly applied on the pretreatment layer 140.

The colloidal silica contributes to an increase in hardness and corrosion resistance. The colloidal silica used preferably has an average particle size of 5-15 nm, and in this case, the colloidal silica can be present as fine and stable colloidal particles in the solvent. If the amount of colloidal silica added is less than 25 wt %, it will be difficult for the colloidal silica to properly exhibit the effect of increasing hardness and corrosion resistance. On the contrary, if the amount of colloidal silica added is more than 30 wt %, it will be difficult to form the primer layer 160, or the adhesion of the primer layer 160 can be reduced.

Particularly, the polyester resin and the colloidal silica are preferably added at a weight ratio of 1.5:1 to 2.5:1.

The epoxy-activating phosphoric compound serves to enhance surface etching rates and activate epoxy groups to thereby increase the adhesion of the primer layer 160. The epoxy-activating phosphoric acid compound that is used in the present invention may be any one selected from among 1-hydroxyethylene-1,1-diphosphonic acid, ammonium phosphate, sodium phosphate monobasic, sodium phosphate dibasic, sodium phosphate tribasic, and zinc phosphate.

If the epoxy-activating phosphoric acid compound is added in an amount of less than 0.5 wt %, the effect of adding the epoxy-activating phosphoric acid compound will be insufficient. On the contrary, if the epoxy-activating phosphoric acid compound is added in an amount of more than 2.0 wt, it will increase the production cost while the effect thereof will no longer increase.

The silane coupling agent serves to increase cross-linking to thereby increase the adhesion of the primer layer 160 to the pretreatment layer 140. If the content of the silane coupling agent is less than 0.5 wt %, the adhesion of the primer layer 160 can be reduced, and if the content of the silane coupling agent is more than 1.0 wt %, the primer layer 160 composition will not be uniform on the steel sheet surface due to its increased viscosity, and the surface treatment property thereof can be reduced.

The silane coupling agent that is used in the present invention may be any one selected from among 3-aminopropyltriepoxysilane, N,N-bis[3-(trimethoxysilyl)propyl]ethylenediamine, N-(β-aminoethyl)-γ-aminopropylmethyldimethoxysilane, N-[2-(vinylbenzylamino)ethyl]-3-aminopropyltrimethoxysilane, N-(1,3-dimethylbutylidene)-3-(triepoxysilane)-1-propaneamine, 3-glycidoxypropyltrimethoxysilane, 3-methaglycidoxypropyltrimethoxysilane, γ-glycidoxypropyltriethoxysilane, γ-glycidoxytrimethyldimethoxysilane, and the like.

The anti-corrosive agent serves to increase hardness and corrosion resistance. The anti-corrosive agent that is used in the present invention may be one or more selected from among titanium sol, silica sol, zirconium sol and the like. If the anti-corrosive agent is added in an amount of less than 0.1 wt %, it will be difficult for the anti-corrosive agent to sufficiently exhibit the effect of increasing hardness and corrosion resistance. On the contrary, if the anti-corrosive agent is added in an amount of more than 10 wt %, it will be difficult to form the primer layer 160, or the adhesion of the primer layer 160 can be reduced.

The wetting agent is added for the purpose of providing a good appearance or workability. The wetting agent that is used in the present invention may be a silicone-based wetting agent or a non-silicone-based wetting agent. If the wetting agent is added in an amount of less than 0.01 wt %, it will be difficult for the wetting agent to sufficiently exhibit the above effect. On the contrary, if the wetting agent is added in an amount of more than 0.2 wt %, there will be a problem in that the adhesion of the primer layer 160 is reduced.

Formation of Flame-Retardant Coating Layer

In step (S230) of forming a flame-retardant coating layer 180, a flame-retardant coating composition is applied to the primer layer 160, followed by drying and curing, thereby forming a flame-retardant coating layer 180.

Herein, the coating process may be performed by one or more selected from among spray squeezing, roll coating and dipping.

This flame-retardant coating layer 180 is preferably dried and cured at a second heat-drying temperature (peak metal temperature (PMT)) of 200 to 250° C. If the second heat-drying temperature is lower than 200° C., a sufficient curing reaction will not occur, resulting in decreases in physical properties. On the contrary, if the second heat-drying temperature is higher than 250° C., the adhesion of the coating layer will be reduced due to abnormal drying, resulting in a decrease in the surface quality. Herein, the drying and curing is preferably performed by one or more selected from among hot-air heating, induction heating, and near-infrared heating.

Meanwhile, the flame-retardant coating composition may include, based on 100 parts by weight, 15-20 parts by weight of silica sol, 5-15 parts by weight of polyurethane resin, 40-70 parts by weight of a solvent, 1-3 parts by weight of an acid catalyst, 0.1-2.0 parts by weight of an acid stabilizer, and a 5-20 parts by weight of a pigment.

The flame-retardant coating composition includes deionized water in addition to the above components, and may include a trace amount of impurities that are inevitably incorporated during the preparation process. Herein, deionized water (DIW) is preferably contained in an amount of 5-15 parts by weight based on 100 parts by weight of the flame-retardant coating composition.

The silica sol is the main component of the flame-retardant coating layer 180, and is added for the purpose of ensuring solvent resistance, fingerprint resistance, corrosion resistance, processability, lubricity, hardness and the like, which are the fundamental physical properties of coatings. Particularly, according to the present invention, high hardness and high processability can be simultaneously ensured by introducing urethane using the silica sol. In addition, the water-soluble silica sol having a very low amount of volatile organic compounds (VOCs) is coated on the base steel sheet, whereby the color-coated steel sheet can have high flame retardancy and ensure scratch resistance (anti-graffiti), easy cleaning, water resistance, water repellency, and salt water resistance, which are the characteristics of ceramics.

This silica sol that is used in the present invention is preferably a sol obtained by hydrolyzing a compound, selected from alkoxysilanes, including tetraethoxysilane (TEOS) and tetraethoxysilane (TMOS), with water in a weakly acidic atmosphere (pH 4-5), and adding 20 parts by weight or less of solid urethane solid to 100 parts by weight of the hydrolysis product, followed by reaction at a temperature of 60 to 80° C. Herein, epoxysilane may be added for surface modification, and an alkoxide of a metal such as zirconium or titanium may further be used to increase corrosion resistance. The urethane that is used in the present invention is preferably cationic urethane, because a silicone-based ceramic polymer having a siloxane (Si—O) structure is likely to be stable in acids. At this urethane content, the flexibility of the coating layer can be increased or decreased. Because the steel sheet is required to have high processability when it is used for household appliances, the solid urethane is preferably added in an amount up to 20 parts by weight. If the solid urethane is added in an amount of more than 20 parts by weight, a problem can arise in that flame retardancy and hardness are reduced.

The polyurethane resin is added in order to ensure strength and corrosion resistance. If the polyurethane resin is added in an amount of less than 5 parts by weight based on 100 parts by weight of the flame-retardant coating composition, the effect of adding the same will be insufficient. On the contrary, if the polyurethane resin is added in an amount of more than 15 parts by weight based on 100 parts by weight of the flame-retardant coating composition, problems can arise in that heat resistance is reduced and the coating layer is discolored.

The solvent serves to allow the components of the composition to be uniformly mixed. The solvent that is used in the present invention is one or more selected from among isopropyl alcohol, methylene chloride, methanol, ethanol, 2-propanol, 2-methoxypropanol, 2-butoxyethanol, etc.

If the solvent is added in an amount of less than 40 parts by weight based on 100 parts by weight of the flame-retardant coating composition, there will be a problem in that the components of the composition are not uniformly mixed. On the contrary, if the solvent is added in an amount of more than 70 parts by weight based on 100 parts by weight of the flame-retardant coating composition, the drying time will be increased, and thus the efficiency of the production process will be reduced.

The acid catalyst that is used in the present invention may be ammonium phosphate, phosphate, etc. This acid catalyst is preferably added in an amount of 1-3 parts by weight based on 100 parts by weight of the flame-retardant coating composition.

The acid stabilizer is added for the purpose of preventing the composition from being gelled by a condensation reaction or delaying the gelling. The acid stabilizer that is used in the present invention is a preferably a diluted strong acid such as diluted nitric acid or hydrochloric acid. If the acid stabilizer is added in an amount of less than 0.1 parts by weight based on 100 parts by weight of the flame-retardant coating composition, the effect of adding the same will be insufficient. On the contrary, if the acid stabilizer is added in an amount of more than 2.0 parts by weight based on 100 parts by weight of the flame-retardant coating composition, the effect thereof will no longer increase, and the production cost will merely increase, resulting in cost ineffectiveness.

The pigment serves to impart a color and to increase rust resistance. The pigment that is used in the present invention may be one or more selected from among $TiO_2$, $P_2O_5$, $Al_2O_3$, CaO, carbon black, inorganic ceramic pigments, etc. If the pigment is added in an amount of less than 5 parts by weight based on 100 parts by weight of the flame-retardant coating composition, the rust resistance of the coating layer can be reduced. On the contrary, if the pigment is added in an amount of more than 20 parts by weight based on 100 parts by weight of the flame-retardant coating composition, the color property of the color-coated steel sheet 100 will decrease rather than increase.

The incombustible color-coated steel sheet 100 for household appliances and building materials, which is manufactured by the above-described process (S210 to S230), has excellent physical properties such as solvent resistance, fingerprint resistance, corrosion resistance, processability, lubricity, hardness and the like, which are the fundamental properties of coatings, and, at the same time, has both high hardness and high processability as a result of introducing urethane using the silica sol. In addition, the incombustible color-coated steel sheet 100 according to the present invention is manufactured by coating the silica sol, which is water-soluble and contains a very small amount of volatile organic compounds (VOCs), on the base steel sheet 120, and has high flame retardancy and can ensure scratch resistance (anti-graffiti), easy cleaning, water resistance, water repellency and salt water resistance, which are the characteristics of ceramics.

In addition, the incombustible color-coated steel sheet 100 for household appliances and building materials according to the present invention has advantages in that the flame-retardant coating layer 180 has the characteristic appearance of coatings even though it has a thickness that is at least two times smaller than the thickness of a general top-coat layer (15-25 μm), and in that the flame-retardant coating layer 180 has excellent flame-retardancy, corrosion resistance, scratch resistance, solvent resistance and lubricity, contains no chromium, and is water-soluble and environmentally friendly.

EXAMPLES

Hereinafter, the present invention will be described in further detail with reference to preferred examples. It is to be understood, however, that these examples are provided for a better understanding of the present invention and are not intended to limit the scope of the present invention.

Contents that are not disclosed herein can be sufficiently understood by any person skilled in the art, and thus the description thereof is omitted.

1. Manufacture of Color-Coated Steel Sheets

Example 1

A pretreatment layer 140 was formed on a hot-dip galvanized steel sheet to a thickness of 3 μm. Then, a primer composition comprising 52 wt % of polyester resin, 27 wt % of colloidal silica, 1.0 wt % of zinc phosphate, 0.7 wt % of 3-aminopropyltriepoxysilane, 5 wt % of titanium sol, 0.1 wt % of a silicone-based wetting agent, and the remainder water, was applied to the pretreatment layer 140 to a thickness of 0.5 μm, and then heat-dried at 160° C., thereby forming a primer layer 160.

Next, a flame-retardant coating composition comprising 17 parts by weight of silica sol, 8 parts by weight of polyurethane resin, 50 parts by weight of isopropyl alcohol, 12 parts by weight of deionized water (DIW), 2 parts by weight of ammonium phosphate, 1.0 part by weight of nitric acid, and 10 parts by weight of $TiO_2$, was applied to the primer layer 160 to a thickness of 8 μm, and then heat-dried at 210° C. to thereby form a flame-retardant coating layer 180, thereby manufacturing a color-coated steel sheet 100 sample.

Example 2

A color-coated steel sheet 100 sample was manufactured in the same manner as described in Example 1, except that a flame-retardant coating composition comprising 16 parts by weight of silica sol, 7 parts by weight of polyurethane resin, 51 parts by weight of isopropyl alcohol, 10 parts by weight of deionized water (DIW), 3 parts by weight of phosphate, 1.0 part by weight of hydrochloric acid, and 12 parts by weight of carbon black, was applied to a thickness of 7 μm, and then heat-dried at 250° C. to thereby form a flame-retardant coating layer 180.

Example 3

A color-coated steel sheet 100 sample was manufactured in the same manner as described in Example 1, except that a flame-retardant coating composition comprising 15 parts by weight of silica sol, 6 parts by weight of polyurethane resin, 50 parts by weight of isopropyl alcohol, 12 parts by weight of deionized water (DIW), 1 part by weight of ammonium phosphate, 1.0 part by weight of nitric acid, and 15 parts by weight of $TiO_2$, was used.

Example 4

A color-coated steel sheet 100 sample was manufactured in the same manner as described in Example 1, except that the flame-retardant coating composition was applied to a thickness of 5 μm, and then heat-dried at 240° C.

Example 5

A color-coated steel sheet 100 sample was manufactured in the same manner as described in Example 1, except that the flame-retardant coating composition was applied to a thickness of 6 μm, and then heat-dried at 250° C.

Comparative Example 1

A color-coated steel sheet 100 sample was manufactured in the same manner as described in Example 1, except that the flame-retardant coating composition was applied to a thickness of 4 μm, and then heat-dried at 180° C.

2. Methods for Evaluation of Physical Properties

Methods for evaluating the color-coated steel sheet 100 samples manufactured in Examples 1 to 5 and Comparative Example 1 are as follows.

(1) Gloss

For evaluation of gloss, the gloss of each sample was measured at an incident angle of 60° by means of Tri-Microgloss-20-60-85 (Sheen Instruments Ltd., England).

(2) Corrosion Resistance

For evaluation of corrosion resistance, a neutral salt spray test was performed on each sample for 48 hours, and then coating layer peeling, loosing, corrosion, rust occurrence, etc., were checked.

Criteria for evaluation are as follows:

Good (O): coating layer peeling, loosing, corrosion and rust occurrence did not occur;

poor (X): coating layer peeling, loosing, corrosion and rust occurrence occurred.

(3) Impact Resistance

For evaluation of impact resistance, an impact was applied to the sample surface under the condition of ½φ×1 kg×500 mm, and then whether the surface was cracked was examined. Criteria for evaluation are as follows:

Good (O): not cracked;

poor (X): cracked.

(4) Processability

For evaluation of processability, a T-bending test was performed on each sample, and whether the sample was cracked at a bending radius of 0 mm was examined. Criteria for evaluation are as follows:

Good (O): not cracked;

poor (X): cracked.

(5) Fingerprint Resistance

For evaluation of fingerprint resistance, each sample was allowed to stand in a constant-temperature and constant-humidity chamber at a temperature of 60° C. and a relative humidity of 95% for 240 hours, and then the change in color ($\Delta E$) of the sample was measured using a color meter. Criteria for evaluation are as follows:

Good (O): $\Delta E=2$;

poor (X): $\Delta E>2$.

(6) Solvent Resistance

For evaluation of solvent resistance, methyl ethyl ketone (MEK) was added to gauze, and then each sample was rubbed 100 times with the gauze using a force of 1 kgf, after which whether resin exfoliation and swelling occurred was examined. Criteria for evaluation are as follows:

Good (O): resin exfoliation and swelling did not occur;

poor (X): resin exfoliation and swelling occurred.

(7) Pencil Hardness

The pencil hardness of each sample was measured using Uni Pencil (Mitsubishi Pencil Co., Ltd., Japan).

3. Evaluation of Physical Properties

Table 1 below the shows the results of evaluation of the physical properties of the samples manufactured in Examples 1 to 5 and Comparative Example 1.

TABLE 1

|  | Gloss | Corrosion resistance | Impact resistance | Processability | Fingerprint resistance | Solvent resistance | Pencil hardness |
| --- | --- | --- | --- | --- | --- | --- | --- |
| Comparative Example 1 | 30 | O | O | O | X | X | 4H |
| Example 1 | 33 | O | O | O | O | O | 4H |
| Example 2 | 32 | O | O | O | O | O | 4H |
| Example 3 | 34 | O | O | O | O | O | 4H |
| Example 4 | 32 | O | O | O | O | O | 4H |
| Example 5 | 34 | O | O | O | O | O | 4H |

As can be seen in Table 1 above, the corrosion resistance, impact resistance, processability, fingerprint resistance and solvent resistance of the samples manufactured in Examples 1 to 5 all satisfied the desired values. In particularly, the samples of Examples 1 to 5 all showed a pencil hardness of 4H and a gloss of 32-34.

However, in the case of the sample of Comparative Example 1, which was out of the flame-retardant coating layer 180 thickness range and second heat-drying temperature range specified in the present invention, the corrosion resistance, impact resistance, processability and pencil hardness satisfied the desired values, but the gloss was only 30.

In addition, it was shown that the sample of Comparative Example 1 had poor fingerprint resistance and solvent resistance.

The present disclosure has been described with reference to the accompanying drawings and the embodiments. Those skilled in the art will appreciate that the embodiments disclosed in this application can be modified and changed without departing from the scope and spirit of the invention as disclosed in the accompanying claims.

The invention claimed is:

1. A method for manufacturing an incombustible color-coated steel sheet, comprising the steps of:
   (a) applying an under-coating agent to a base steel sheet, followed by heat drying, thereby forming a pretreatment layer;
   (b) applying a primer coating composition to the pretreatment layer, followed by heat drying, thereby forming a primer layer; and
   (c) applying a flame-retardant coating composition to the primer layer, followed by drying and curing at a temperature of 200° C., thereby forming a flame-retardant coating layer, the flame- retardant coating composition comprising, based on 100 parts by weight of the flame-retardant coating composition, 15-20 parts by weight of silica sol, 5-15 parts by weight of polyurethane resin, 40-70 parts by weight of a solvent, 1-3 parts by weight of an acid catalyst, 0.1-2.0 parts by weight of an acid stabilizer, and 5-20 parts by weight of a pigment,
   wherein the flame-retardant coating layer has a thickness of 5 to 10 μm.

2. The method of claim 1, wherein the primer layer in step (b) comprises 50-60 wt % of the primer layer being polyester resin, 25-30 wt % of the primer layer being colloidal silica, 0.5-2.0 wt % of the primer layer being an epoxy-activating phosphoric acid compound, 0.5-1.0 wt % of the primer layer being a silane coupling agent, 0.1-10 wt % of the primer layer being at least one anti-corrosive agent selected from the group consisting of titanium sol, silica sol and zirconium sol, and 0.01-0.20 wt % of the primer layer being a wetting agent, wherein the epoxy activating phosphoric acid compound comprises any one selected from the group consisting of 1-hydroxyethylene-1,1-diphosphonic acid, ammonium phosphate, sodium phosphate monobasic, sodium phosphate dibasic, sodium phosphate tribasic, and zinc phosphate,
wherein the epoxy-activating phosphoric compound activates epoxy groups of the silane coupling agent, and
wherein the silane coupling agent is any one selected from the group consisting of 3-aminopropyltriepoxysilane, N-(1,3-dimethylbutylidene)-3-(triepoxysilane)-1-propaneamine, 3-glycidoxypropyltrimethoxysilane, 3-methaglycidoxypropyltrimethoxysilane, γ-glycidoxypropyltriethoxysilane, and γ-glycidoxytrimethyldimethoxysilane.

3. The method of claim 2, wherein the polyester resin and the colloidal silica are added at a weight ratio of 1.5:1 to 2.5:1.

4. The method of claim 1, wherein the primer layer in step (b) is dried at a first heat-drying temperature (peak metal temperature (PMT)) of 120 to 200° C.

5. The method of claim 1, wherein the pigment is at least one selected from the group consisting of $TiO_2$, $P_2O_5$, $Al_2O_3$, CaO, carbon black, and inorganic ceramic pigments.

6. The method of claim 1, wherein the heat drying in step (c) is performed by one or more selected from the group consisting of hot-air heating, induction heating, and far-infrared heating.

7. An incombustible color-coated steel sheet comprising:
a base steel sheet;
a pretreatment layer coated on the base steel sheet;
a primer layer coated on the pretreatment layer; and
a flame-retardant coating layer coated on the primer layer, the flame-retardant coating layer formed from a flame-retardant coating composition comprising, based on 100 parts by weight of the flame-retardant coating composition, 15-20 parts by weigh of silica sol, 5-15 parts by weight of polyurethane resin, 40-70 parts by weight of a solvent, 1-3 parts by weight of an acid catalyst, 0.1-2.0 parts by weight of an acid stabilizer, and 5-20 parts by weigh of a pigment,
wherein the flame-retardant coating layer has a thickness of 5 to 10 μm,
wherein the flame-retardant coating layer is formed by applying a flame-retardant coating composition, followed by drying and curing at a temperature of 200° C. to 250° C.

8. The incombustible color-coated steel sheet of claim 7, wherein the pigment is at least one selected from the group consisting of TiO2, P2O5, Al2O3, CaO, carbon black, and inorganic ceramic pigments.

9. The incombustible color-coated steel sheet of claim 7, wherein the primer layer comprises 50-60 wt % of the primer layer being polyester resin, 25-30 wt % of the primer layer being colloidal silica, 0.5-2.0 wt % of the primer layer being an epoxy-activating phosphoric acid compound, 0.5-1.0 wt % of the primer layer being a silane coupling agent, 0.1-10 wt % of the primer layer being at least one anti-corrosive agent selected from the group consisting of titanium sol, silica sol and zirconium sol, and 0.01-0.20 wt % of the primer layer being a wetting agent,
wherein the epoxy-activating phosphoric compound activates epoxy groups of the silane coupling agent, and
wherein the silane coupling agent is any one selected from the group consisting of 3-aminopropyltriepoxyslane, N-(1,3-dimethylbutylidene)-3-(triepoxysilane)-1-propaneamine, 3-glycidoxypropyltrimethoxysilane, 3-methaglycidoxypropyltrimethoxysilane, γ-glycidoxypropyltriethoxysilane, and γ-glycidoxytrimethyldimethoxysilane.

10. The incombustible color-coated steel sheet of claim 7, wherein the primer layer has a thickness of 0.3-1.0 μm.

* * * * *